United States Patent [19]

Denker et al.

[11] Patent Number: 4,824,166
[45] Date of Patent: Apr. 25, 1989

[54] UNDERSTRUCTURE FOR AN AUTOMOBILE

[75] Inventors: Dietrich Denker, Cremlingen; Peter Seifert, Gifhorn; Otto Weber, Wolfsburg; Horst Schicht, Gifhorn, all of Fed. Rep. of Germany

[73] Assignee: Volkswagen AG, Wolfsburg, Fed. Rep. of Germany

[21] Appl. No.: 68,652

[22] Filed: Jul. 1, 1987

[30] Foreign Application Priority Data

Jul. 3, 1986 [DE] Fed. Rep. of Germany ....... 3622332

[51] Int. Cl.⁴ .............................................. B62D 21/00
[52] U.S. Cl. .................................... 296/204; 180/312; 280/792
[58] Field of Search ............... 296/204, 194, 209, 187, 296/185

[56] References Cited

U.S. PATENT DOCUMENTS

| 3,791,472 | 2/1974 | Tatsumi | 296/204 |
| 4,129,330 | 12/1978 | Schwuchow | 296/204 |
| 4,557,519 | 12/1985 | Matsuura | 296/204 |

Primary Examiner—Robert R. Song
Attorney, Agent, or Firm—Brumbaugh, Graves, Donohue & Raymond

[57] ABSTRACT

In order to reduce the interior noise level in an automobile, the vibration excitation of the front region of the floor panel is reduced by means of localized gaps between front longitudinal members, on the one hand, and the floor panel, on the other hand, as well as through support of the longitudinal members by a cross member in an approximately middle region of the sill members only, whereas the vibration excitation of the rear region of the floor panel is increased, so that in the head region of the vehicle occupants airborne vibration components are present which in amplitudes as well as phases are suitable to extinguish one another by means of interference.

7 Claims, 2 Drawing Sheets

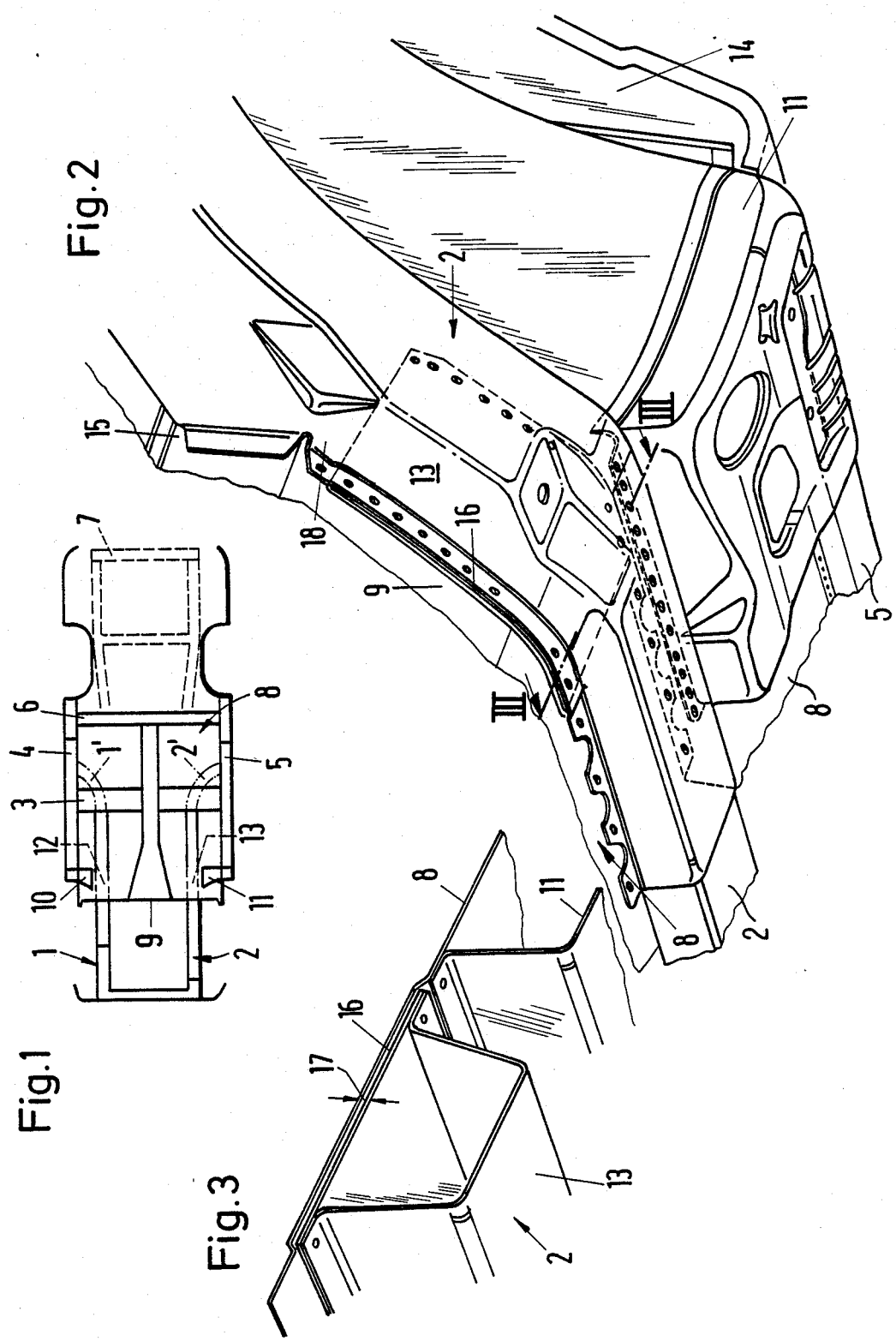

UNDERSTRUCTURE FOR AN AUTOMOBILE

BACKGROUND OF THE INVENTION

The invention concerns an understructure for an automobile. The understructure being of a type with longitudinal members which support a drive unit and bear on sill members by way of cross members, and a floor panel forming a foot slope the course of which is followed by the longitudinal members so as to form gaps for vibration neutralization.

One problem in modern vehicle production with its tendency towards lightweight construction resides in keeping the interior noise level in the passenger compartment low, in spite of the utilization of body plates which are relatively thin.

The interior noise of the vehicle is determined essentially by low-frequency components which are excited by the drive unit with intake and exhaust systems as well as by the tire-road combination. At the internal combustion engine appear free forces and moments which cause the drive unit to vibrate. For example, in the widely utilized four-cylinder reciprocating-piston in-line engine are active forces of the second order of the engine speed in the direction of the piston movement, so that the entire unit undergoes vibrations. It vibrates at double the frequency of the engine speed in the piston movement direction and radiates, in particular above and below its contour, airborne sound which in part is resonance-like increased in the engine space and is introduced via the front wall and, respectively, the foot slope of the floor panel into the passenger compartment and, following reflection by the road surface, also penetrates the vehicle interior through the vehicle floor.

Due to the vibrations, there occurs in addition a solid-borne vibration excitation by way of the drive unit and undercarriage bearings as also further contact points, such as, e.g., hoses, clutch cable and steering assembly. Thereby flexural waves are introduced into the body so that numerous resonance-type plate vibrations occur which act like loudspeakers and together with the aforedescribed airborne sound component produce the low-frequency interior noise. Frequently, air space modes of the vehicle interior are excited, too, which leads to particularly troublesome humming increases.

However, the vehicle interior noise is not generated everywhere at the same level. In some body regions, very small body vibrations are sufficient to produce disagreeable humming increases. These sites are, e.g., the front wall, bottom, the floor slope, front, and the rear leg space ahead of the rear seat as well as the front roof region. The sounds radiated here can interfere with one another because of the spatial dimensions, e.g., between the front and rear leg spaces, on the one hand, (sources), and the ears of the vehicle occupant, on the other hand, (receivers), and as a result, interior noise amplifications as well as interior noise decreases can be caused according to undesirable interior noise dynamics over extended speed ranges.

In the understructure for automobiles known from characteristics DE-OS No. 21 45 467, B62D 23/00 which contains the characteristics of the above-mentioned type of understructure, the longitudinal members are completely uncoupled from the floor panel by gaps. Force introduction is effected directly into the sill members, namely, by way of torsion boxes into the front end regions of the sill members extending below the A columns as well as by way of individual cross members into sill member regions behind the former. It is true that this uncoupling has a favorable effect as regards a direct vibration excitation of the floor panel originating with the drive unit. However, such a construction does not take into account the vibration excitation due to reflection by the road surface described above.

SUMMARY OF THE INVENTION

Accordingly, it is an object of the present invention to improve an understructure of the above-mentioned type with a view to the reduction of the interior noise level in the passenger compartment of a vehicle.

Pursuant to this object, and others which will become apparent hereafter, one aspect of the present invention resides in the longitudinal members being connected with the floor panel in an upper region of the foot slope as well as behind the foot slope. In addition, the longitudinal members bear on a cross member, arranged in a mid-longitudinal region of the passenger compartment and connected with the sill members, without being directly connected with the sill members arranged in front thereof.

Contrary to the known construction described previously, the invention provides for intentional—even though reduced-direct introduction of vibrations from the longitudinal members into the floor panel, however, in such a manner that the panel vibrations in the front floor region and in the rear floor region are tuned relative to one another such that in the head region of the vehicle occupants, extinguishing effects occur due to the interference of the sound waves emitted by the two floor regions. Tests have shown that upon reduced direct vibration introduction according to the invention in the front regions of the floor panel and a correspondingly increased vibration excitation of the rear region of the floor panel, there will occur in vehicles of conventional dimensions amplitudes and phases of the vibrations of the air generated by these "sound sources" which in the region of the vehicle occupants heads lead to the extinguishing interferences.

A special advantage of the invention is that it reduces at least one disadvantage of transversely mounted drive units. This disadvantage consists in that inasmuch as transversely installed drive units have engine mounts which are more rigid than those of longitudinally mounted drive units, a much larger share of the forces introduced into the body is in the critical low-frequency range since with a transversely mounted drive unit, the support via the rear axle transmission is absent. Moreover, application of the invention also results in a clear decrease of the rolling noises in the 125 to 500 Hz frequency range.

An example of an embodiment of the invention applied to a passenger automobile is explained in the following with reference to the drawing.

BRIEF DESCRIPTION OF THE DRAWING

FIG. 1 represents a schematic plan view of the components of the understructure of interest here pursuant to the present invention;

FIG. 2 shows in perspective, diagonally from below, the conditions in the region of the left front wheel arch of the vehicle;

FIG. 3 is a cross-sectional view indicated in FIG. 2 by III—III.

DETAILED DESCRIPTION OF THE PREFERRED EMBODIMENTS

Figure 2A:
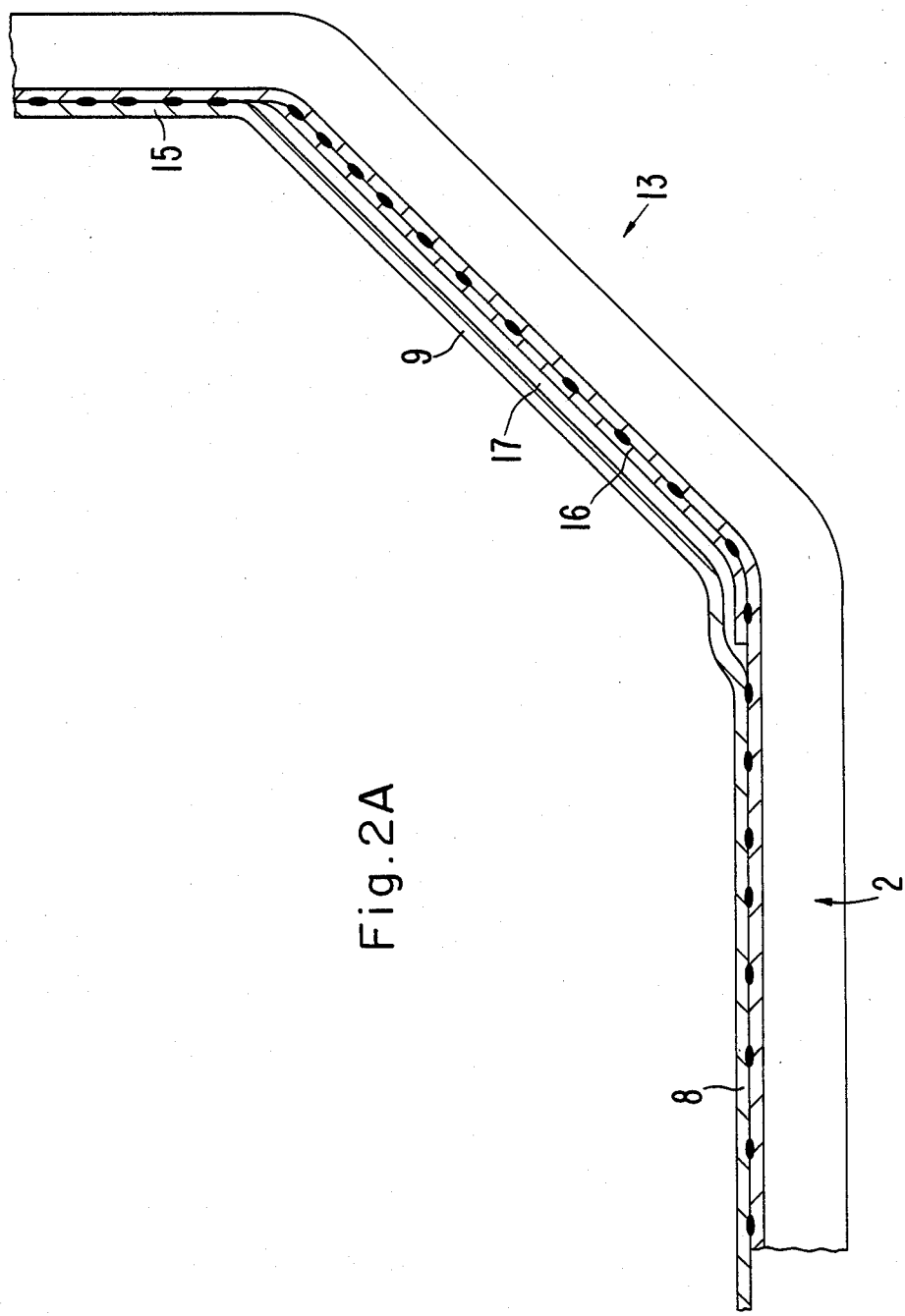
FIG. 2A is a fragmentary side view, looking from the center of the vehicle toward the left side, of the region of the vehicle illustrated in FIG. 2, showing the relation between the front longitudinal member and the floor panel, foot slope and front wall of the vehicle.

Viewing FIG. 1, it is seen that the understructure comprises two front longitudinal members -1- and -2- which serve to support a drive unit, not shown. By means of a seat cross member -3-, which also serves to fix the front seats, of the vehicle, the longitudinal members 1, 2 bear on sill members -4- and -5-. The understructure is complemented by a rear cross member -6- as well as a rear supporting structure generally designated by -7-.

In its front region, a floor panel -8- forms an upwardly inclined foot slope -9- which, in a customary manner is followed on top by a front wall, not shown. In the region of the front ends of the sill members -4- and -5- are furthermore arranged connecting means -10- and -11- between the sill members -4- and -5-, on the one side, and the floor panel -8-, on the other side.

Disregarding the fact that the floor panel -8- extends above the various members, the regions of the members which are joined rigidly with the floor panel, e.g., by spot welding, are indicated in full lines. This means that the longitudinal members -1- and -2- in regions -12- and -13 indicated by dashes, i.e., between the front edge region of the foot slope -9- and a region of the floor panel -8- directly behind said slope, are not joined with the panel. This results in a decrease of the vibration excitation in the region of the floor panel -8-. On the other hand, the introduction of vibrations into the rear region of the floor panel is increased, said region being in connection, e.g , with the seat cross member -3-.

Details of the arrangement are shown in FIGS. 2, 2A and 3. By -14- is indicated the left front wheel arch of the automobile. The longitudinal member -2- which rises as far as the region of the front wall -15- is provided in the aforeindicated region -13- with an individual closing plate -16-which with the floor panel -8- encloses a gap -17-, visible in particular in FIG. 3, so that there the floor panel -8- and the longitudinal member -2- are not in direct contact. The same conditions prevail in the region of the right longitudinal member -1- which is not visible in FIGS. 2, 2 and 3. In all of its other regions which follow the course of the floor panel -8-, the longitudinal member, as shown in FIG. 2, is complemented by the floor panel proper so as to form a closed hollow profile.

FIGS. 2 and 2A furthermore that the longitudinal member -2- in the region of the upper end of the foot slope -9-, i.e., at -18-, is again connected with the foot slope by spot welding so that the gap -17-—and a corresponding gap at the right longitudinal member—does not cause a complete neutralization of vibrations between the longitudinal member and the floor panel but rather a decrease in the transmission of vibrations. Accordingly, the vibration excitation of the region of the floor panel -8- approximately in front of the seat cross member -3- (see FIG. 1) is decreased whereas the vibration excitation of the floor panel region behind the said cross member is increased. By this measure is attained the aforedescribed interference extinguishing effect at the height of the vehicle occupants' heads.

From FIG. 2 it also becomes clear that the connecting means -11- (and accordingly the right-side connecting means -10-) is not in direct connection with the longitudinal member -2- (and, respectively, the right-side longitudinal member -1-).

As shown in FIG. 2 for the longitudinal member -2-, the longitudinal members follow the contour of the wheel arch concerned, in this case the left wheel arch -14-. In a region higher than the foot slope -9-, the longitudinal members may be rendered in such a manner that they comprise zones of decreased geometrical moments of inertia relative to transverse axes, from which it becomes clear that the measures according to the invention are not taken at the expense of the necessary crash optimization of the understructure. By such measures and the use of suitable plate thicknesses, the vibration excitation in the front and rear regions of the floor panel can be additionally influenced in a manner that lends itself to optimization of the interference effect. As regards the closing plates for the longitudinal members, i.e., e.g., the closing plate -16- for the left longitudinal member -2-, plate thicknesses ranging from 0.9 to 2.0 mm have proved to be favorable.

As indicated in FIG. 1 by lines in dots and dashes, the cross member may be replaced or formed by end zones -1'- and -2'- of the longitudinal member having transverse components. Support of the longitudinal members on the sill members in a center region thereof is decisive.

By the invention is thus created an understructure for an automobile which, while preserving its favorable crash behavior, ensures in a novel manner a decrease in the interior noise level by means o-f interference effects.

While the invention has been illustrated and described as embodied in an understructure for an automobile, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint or prior art, fairly constitute essential characteristics of the generic or specific aspects of this invention.

What is claimed as new and desire to be protected by Letters Patent is set forth in the appended claims.

We claim:

1. An improved understructure for an automobile having a passenger compartment, the understructure having longitudinal members which support a drive unit and bear on sill members by way of connecting means, and a floor panel forming a foot slope the course of which is followed by the longitudinal members so as to form gaps for vibration neutralization, the improvement comprising: the longitudinal members being provided so as to by connected with the floor panel in an upper region of the foot slope as well as behind the slope and further provided so as to bear on a part of said connecting means, arranged in a mid-longitudinal region of the passenger compartment and connected with the sill members, without being connected with the sill members arranged in front thereof.

2. An understructure as defined in claim 1, wherein said part of said connecting means is a cross member.

3. An understructure as defined in claim 2, wherein said cross member is a seat cross member.

4. An understructure as defined in claim 2; and further comprising closing plates provided on the longitudinal members below the foot slope so as to form gaps with the foot slope.

5. An understructure as defined in claim 2, wherein above the foot slope the longitudinal members are provided with regions of decreased geometrical moments of inertia relative to transverse axes.

6. An understructure as defined in claim 1, wherein said part of said connecting means is the end regions of the longitudinal members, said end regions being bent in a direction towards the sill members.

7. An understructure for an automobile having a drive unit and a passenger compartment, comprising:
   longitudinal members provided so as to support the drive unit;
   sill members parallel to said longitudinal members;
   cross members connected to said longitudinal members and said sill members so that said longitudinal members bear on said sill members, one of said cross members being arranged in a mid-longitudinal region of the passenger compartment;
   and a floor panel forming a foot slope having a course and an upper region, said longitudinal members being provided so as to follow the course of said foot slope to thereby form gaps between said floor panel and said longitudinal members for vibration neutralization, further, said longitudinal members being connected with said floor panel in the upper region of said foot slope and behind said slope so as to bear on said one cross member without being directly connected to said sill members.

* * * * *